United States Patent
Kojima et al.

(10) Patent No.: US 10,259,083 B2
(45) Date of Patent: Apr. 16, 2019

(54) CLEANING FLUX, CLEANING SOLDER PASTE, AND SOLDER JOINT

(71) Applicant: Senju Metal Industry Co., Ltd., Tokyo (JP)

(72) Inventors: Naokatsu Kojima, Tochigi (JP); Daisuke Maruko, Tochigi (JP)

(73) Assignee: Senju Metal Industry Co., Ltd., Tokyo (JP)

(*) Notice: Subject to any disclaimer, the term of this patent is extended or adjusted under 35 U.S.C. 154(b) by 445 days.

(21) Appl. No.: 14/917,363

(22) PCT Filed: Sep. 12, 2013

(86) PCT No.: PCT/JP2013/074752
§ 371 (c)(1),
(2) Date: Mar. 8, 2016

(87) PCT Pub. No.: WO2015/037107
PCT Pub. Date: Mar. 19, 2015

(65) Prior Publication Data
US 2016/0221128 A1    Aug. 4, 2016

(51) Int. Cl.
*B23K 35/02* (2006.01)
*B23K 35/36* (2006.01)
*C08G 65/26* (2006.01)
*B23K 35/362* (2006.01)

(52) U.S. Cl.
CPC .......... *B23K 35/362* (2013.01); *B23K 35/025* (2013.01); *B23K 35/0222* (2013.01); *B23K 35/0244* (2013.01); *B23K 35/3612* (2013.01); *B23K 35/3613* (2013.01); *B23K 35/3616* (2013.01); *C08G 65/2612* (2013.01)

(58) Field of Classification Search
CPC ................ B23K 35/362; B23K 35/025; B23K 35/3612; B23K 35/0222; B23K 35/3616; B23K 35/3613; B23K 35/0244; C08G 65/2612
See application file for complete search history.

(56) References Cited

U.S. PATENT DOCUMENTS

| | | | | |
|---|---|---|---|---|
| 2,898,255 A | * | 8/1959 | Thompson | B23K 35/3613 148/23 |
| 3,837,932 A | * | 9/1974 | Aronberg | H01M 2/28 148/23 |
| 4,077,815 A | | 3/1978 | Schuessler | |
| 2007/0125449 A1 | * | 6/2007 | Kajiwara | B23K 35/025 148/23 |
| 2008/0237301 A1 | * | 10/2008 | Hirano | B21C 37/02 228/56.3 |
| 2010/0252144 A1 | | 10/2010 | Ishikawa et al. | |
| 2011/0094545 A1 | * | 4/2011 | Tanaka | B23K 1/206 134/104.4 |

FOREIGN PATENT DOCUMENTS

| EP | 0311881 A2 | 4/1989 |
|---|---|---|
| JP | 10202393 A | 8/1998 |
| JP | 2003103397 A | 4/2003 |
| WO | 9205228 A1 | 4/1992 |
| WO | 2008114711 A1 | 9/2008 |
| WO | 2009069600 A1 | 6/2009 |

* cited by examiner

*Primary Examiner* — Anthony J Zimmer
(74) *Attorney, Agent, or Firm* — The Webb Law Firm

(57) ABSTRACT

A cleaning flux contains as a solvent 60-98% by weight of one or both of an alkylene oxide-resorcinol copolymer and an ethylene oxide-propylene oxide condensation-added alkylene diamine. An addition amount of the alkylene oxide-resorcinol copolymer is within a range of 0-98% by weight and the addition amount of the ethylene oxide-propylene oxide condensation-added alkylene diamine is within the range of 0-98% by weight. The cleaning flux further includes one or both of an organic acid and a halogen compound. The addition amount of the organic acid is within the range of 0-18% by weight and the addition amount of the halogen compound is within the range of 0-4% by weight.

6 Claims, No Drawings

CLEANING FLUX, CLEANING SOLDER PASTE, AND SOLDER JOINT

This application is the United States national phase of International Application No. PCT/JP2013/074752 filed Sep. 12, 2013, the disclosure of which is hereby incorporated in its entirety by reference.

TECHNICAL FIELD

The present invention relates to cleaning flux that suppresses its volatilization by heating during soldering, cleaning solder paste in which the cleaning flux and solder alloy powder are mixed and a solder joint that is formed by using the cleaning flux or the cleaning solder paste.

BACKGROUND

In general, the flux used for soldering has positive effects for chemically removing a metal oxide that resides at a solder alloy and a metal surface of a bonding object to be soldered and for allowing metallic elements to move at a boundary therebetween. Therefore, by soldering with the flux, an intermetallic compound can be formed between the solder alloy and the metallic surface of the bonding object to accomplish a strong bonding.

In the soldering using a spherical solder alloy called a solder ball, the soldering is executed by applying the flux to an electrode on a substrate, mounting the solder ball on the electrode to which the flux is applied, and melting the solder by heating the substrate in a heating furnace called a reflow furnace.

The solder paste is a complex material obtained by mixing the solder alloy powder and the flux. In the soldering using the solder paste, the soldering is executed by applying the solder paste to a portion to be soldered such as an electrode on a substrate, mounting a part on the portion to be soldered to which the solder paste is applied, and melting the solder by heating the substrate in a reflow furnace.

For example, in a soldering process using a Sn—Ag based solder alloy, a temperature profile is set so as to increase a temperature of the reflow furnace to 220° C., which is a melting temperature of the solder alloy, or higher. In general, a peak temperature, which is the upper limit temperature in the reflow furnace in the soldering process, is set to be about 240-250° C.

The flux comprises a solid component, a solvent for dissolving the solid component and the like. However, in the flux comprising conventional components, the solvent component and the like in the flux are volatilized by the heating during the soldering.

When the solvent component and like in the flux are volatilized by the heating during the soldering, gas flux fumes occur. The flux fumes adhere to places, such as a wall surface or a cooling zone in the reflow furnace, having a temperature lower than that during the heating, and then they become liquid.

Thus, when the volatilized components of the flux adhere in the reflow furnace and they become liquid, there is a possibility such that the liquid falls in drops to a product carried in the reflow furnace. Therefore, a constant cleanup work is required.

A water-soluble adhesive has been proposed for temporally fixing a solder ball having a small diameter to an electrode (refer to, for example, Patent Document 1). However, it has not considered any volatilization volume thereof at all and its composition is assumed under a condition that the solvent is volatilized.

DOCUMENT FOR PRIOR ART

Patent Document

Patent Document 1: WO2008/114711

SUMMARY OF THE INVENTION

Problems to be Solved by the Invention

In the past, in flux, the solvent is a main component that volatilizes in the soldering process and adheres in the reflow furnace. In the past, it has not been proposed to form the flux by focusing on the suppression of the solvent volatilization and the suppression of the whole flux volatilization.

The present invention solves these problems and has an object to provide a cleaning flux that does not inhibit a function for removing a metal oxide film but can suppress volatilization by heating during soldering and clean a residue; a cleaning solder paste in which the cleaning flux and solder alloy powder are mixed; and a solder joint that is formed by using the cleaning flux or the cleaning solder paste.

Means for Solving the Problems

As described hereinbefore, the solvent is the main component that volatilizes in the soldering process and adheres in the reflow furnace. On the other hand, since a component added as an activator to the flux also volatilizes during the soldering process, it is one of elements of stain in the reflow furnace. However, reducing an addition amount of the activator causes a capability of removing the metal oxide film to be reduced.

Accordingly, the inventors of the present application have found that, by using a compound having the functions of the solvent and the activator and having the capability of cleaning the residue generated by suppressing the volatilization, the stain in the reflow furnace can be reduced while suppressing the volatilization based on the heating during the soldering without inhibiting the function of removing the metal oxide film.

The present invention relates to a cleaning flux that contains a solvent having a polarity of dissolving the flux component and a boiling point of 330° C. or higher wherein a volatilization volume occurred at the reflow soldering process is equal to or less than 20% of the whole flux volume. The cleaning flux of the present invention contains as the solvent 60-98% by weight of one or both of an alkylene oxide-resorcinol copolymer and an ethylene oxide-propylene oxide condensation-added alkylene diamine wherein an addition amount of the alkylene oxide-resorcinol copolymer is within a range of 0-98% by weight and the addition amount of the ethylene oxide-propylene oxide condensation-added alkylene diamine is within the range of 0-98% by weight. This cleaning flux further contains one or both of an organic acid and a halogen compound wherein the addition amount of the organic acid is within the range of 0-18% by weight and the addition amount of the halogen compound is within the range of 0-4% by weight. The addition amount of a thixotropic agent is 0-30% by weight and the addition amount of rosin is 0-15% by weight.

Further, according to the present invention, in a cleaning solder paste in which the cleaning flux and solder alloy powder are mixed, the cleaning solder paste is characterized in that a flux contains a solvent having a polarity of dissolving a flux component and having a boiling point of 330° C. or higher, and a volatilization volume occurred in a reflow soldering process is equal to or less than 20% of the whole flux. In the cleaning solder paste of the present invention, the cleaning flux contains as the solvent 60-93% by weight of one or both of an alkylene oxide-resorcinol copolymer and an ethylene oxide-propylene oxide condensation-added alkylene diamine wherein an addition amount of the alkylene oxide-resorcinol copolymer is 0-93% by weight and the addition amount of the ethylene oxide-propylene oxide condensation-added alkylene diamine is within the range of 0-93% by weight, contains one or both of an organic acid and a halogen compound wherein the addition amount of the organic acid is within the range of 0-18% by weight and the addition amount of the halogen compound is within the range of 0-4% by weight, and contains 5-30% by weight of a thixotropic agent and 0-15% by weight of a rosin.

Moreover, the present invention relates to a solder joint formed by using the aforementioned cleaning flux or cleaning solder paste.

Effects of the Invention

In the present invention, the alkylene oxide-resorcinol copolymer and the ethylene oxide-propylene oxide condensation-added alkylene diamine added as the solvent component to the cleaning flux have the polarity of dissolving the flux material and the boiling point that is higher than the peak temperature in the furnace during the soldering process using the reflow furnace by 80° C. or higher. Therefore, the volatilization of the solvent component in the soldering process is suppressed. Since the volatilization of the solvent component in the flux is suppressed, the flux fume is inhibited from adhering in the reflow furnace. Therefore, stain can be reduced in the reflow furnace.

By selecting the alkylene oxide-resorcinol copolymer and the ethylene oxide-propylene oxide condensation-added alkylene diamine having also a function of an activating adjuvant, an addition amount of the organic acid can be reduced without lowering a capability of removing the metal oxide film. Therefore, stain can be reduced in the reflow furnace.

EMBODIMENT FOR CARRYING OUT THE INVENTION

Composition Example of Cleaning Flux According to this Embodiment

A cleaning flux according to an embodiment contains one or both of the alkylene oxide-resorcinol copolymer and the ethylene oxide-propylene oxide condensation-added alkylene diamine and further the organic acid. The cleaning flux according to the embodiment may contain the thixotropic agent.

The cleaning flux according to the embodiment is used for a solder joint called a chip attach or a ball attach. The cleaning flux according to the embodiment is mixed with the solder alloy powder and is used as the cleaning solder paste.

The alkylene oxide-resorcinol copolymer and the ethylene oxide-propylene oxide condensation-added alkylene diamine are added mainly as the solvent component in the cleaning flux to dissolve the solid component in the cleaning flux. Moreover, the alkylene oxide-resorcinol copolymer and the ethylene oxide-propylene oxide condensation-added alkylene diamine have also the function of the activating adjuvant component that removes the metal oxide film.

The alkylene oxide-resorcinol copolymer and the ethylene oxide-propylene oxide condensation-added alkylene diamine have the boiling point higher than the peak temperature of the soldering process using the reflow furnace by 80° C. or higher. Here, in the soldering process, the temperature in the reflow furnace is about 240-250° C. and a compound having the boiling point of 330° C. or higher is selected for the solvent component.

The alkylene oxide-resorcinol copolymer and the ethylene oxide-propylene oxide condensation-added alkylene diamine are soluble in water or a predetermined cleaning agent. An ethylene oxide and a propylene oxide are listed for the alkylene oxide portion of the alkylene oxide-resorcinol copolymer, and an ethylene, propylene, an isopropylene and the like are listed for the ethylene oxide-propylene oxide condensation-added alkylene diamine.

The organic acid is added as the activator component for the flux. The organic acid may be a general organic acid having 10 or less carbon atoms. For example, the organic acid is preferably a carboxylic acid having 4-10 carbon atoms (C4-C10) with a carboxyl group.

The halogen compound is added as the activator component for the flux. The halogen compound may be an amine hydrobromide and a halogeno alcohol. For example, the amine hydrobromide is an ethyl amine hydrobromide, a propyl amine hydrobromide, a diethyl amine hydrobromide, a diphenyl guanidine hydrobromide or the like, and the halogeno alcohol is a 2,3-dibromo-1,4-butanediol, a trans-2,3-dibromo-2-butene-1,4-diol or the like.

The thixotropic agent is added as appropriate for giving a thixotropy. The thixotropic agent is soluble in water or a predetermined cleaning agent and may be a compound having a suppressed volatilization. An example of the thixotropic agent is a higher fatty acid amide, hardened castor oil, a polyethylene glycol having 1000 or more molecular weight, or preferably the polyethylene glycol having 1500 or more molecular weight.

The rosin protects the activator component such as the organic acid and the halogen compound from the heat and suppresses the activator component from volatilizing. The rosin may be soluble in the predetermined cleaning agent, and modified rosin, polymerized rosin, hydrogenated rosin or the like are exemplified.

The alkylene oxide-resorcinol copolymer and the ethylene oxide-propylene oxide condensation-added alkylene diamine added as the solvent component have the boiling point higher than the peak temperature in the furnace during the soldering process using the reflow furnace by 80° C. or higher.

Therefore, the volatilization of the solvent component can be suppressed in the soldering process using, for example, the solder ball. By suppressing the volatilization of the solvent component in the flux, the flux fume can be inhibited from adhering to the furnace. Therefore, the stain in the furnace is reduced.

On the other hand, a component in the flux, which does not resolve and volatilize by heating during the soldering, remains as a flux residue after the soldering. Since the volatilization of the alkylene oxide-resorcinol copolymer and the ethylene oxide-propylene oxide condensation-added alkylene diamine are suppressed by heating during the soldering, they remain as the flux residue after the soldering.

Therefore, when selecting the solvent component having a high boiling point so as to suppress the volatilization based on the heating during the soldering, the alkylene oxide-resorcinol copolymer and the ethylene oxide-propylene oxide condensation-added alkylene diamine have been selected. Moreover, when adding the thixotropic agent, the compound, which can be cleaned with water or the predetermined cleaning agent, has been selected. Therefore, it is possible to clean the flux residue by the components that do not volatilize with the heating during the soldering.

In addition, if the volatilization of the solvent component in the flux is suppressed, the flux can be inhibited from solidifying. Therefore, since the flux spreads on the surface of the electrode and the surface of the solder ball and the metal oxide film can be removed, the solder wettability can be kept.

The alkylene oxide-resorcinol copolymer and the ethylene oxide-propylene oxide condensation-added alkylene diamine added as the solvent component serve as the activating adjuvant component that removes the metal oxide film. Therefore, it is possible to reduce the addition amount of the activator component, namely, the organic acid and the halogen compound in this example.

Since the organic acid and the halogen compound in the flux volatilize in the soldering process, it is one of the elements of staining in the reflow furnace. However, by reducing the addition amount of the organic acid and the halogen compound, the capability of removing the metal oxide film is decreased.

By selecting as the solvent component the alkylene oxide-resorcinol copolymer and the ethylene oxide-propylene oxide condensation-added alkylene diamine having also the function of the activating adjuvant, the addition amount of the organic acid and the halogen compound can be reduced without lowering the capability of removing the metal oxide film. Therefore, the stain can be reduced in the reflow furnace.

In the flux, by increasing the additive amounts of the organic acid and the halogen compound, the wettability of the solder is improved. On the other hand, if the additive amounts of the organic acid and the halogen compound are increased, then the additive amounts of the alkylene oxide-resorcinol copolymer and the ethylene oxide-propylene oxide condensation-added alkylene diamine are decreased relatively, and a ratio of the volatilized component is increased in the flux.

Therefore, the cleaning flux of this embodiment contains one or both of the alkylene oxide-resorcinol copolymer and the ethylene oxide-propylene oxide condensation-added alkylene diamine. The addition amount of the alkylene oxide-resorcinol copolymer is within the range of 0-98% by weight and the addition amount of the ethylene oxide-propylene oxide condensation-added alkylene diamine is within the range of 0-98% by weight. In a case of containing both of the alkylene oxide-resorcinol copolymer and the ethylene oxide-propylene oxide condensation-added alkylene diamine, the total addition amount of the alkylene oxide-resorcinol copolymer and the ethylene oxide-propylene oxide condensation-added alkylene diamine is 60-98% by weight.

In a case of containing either the alkylene oxide-resorcinol copolymer or the ethylene oxide-propylene oxide condensation-added alkylene diamine, the addition amount of the alkylene oxide-resorcinol copolymer or the ethylene oxide-propylene oxide condensation-added alkylene diamine is 60-98% by weight.

Moreover, one or both of the organic acid and the halogen composition are contained wherein the addition amount of the organic acid is within the range of 0-18% by weight and the addition amount of the halogen composition is within the range of 0-4% by weight. The addition amount of the thixotropic agent is 0-30% by weight and the addition amount of the rosin is 0-15% by weight.

The cleaning solder paste of the embodiment is formed by mixing the aforementioned cleaning flux and the solder alloy powder. The cleaning flux for forming the cleaning solder paste contains one of both of the alkylene oxide-resorcinol copolymer and the ethylene oxide-propylene oxide condensation-added alkylene diamine. The addition amount of the alkylene oxide-resorcinol copolymer is within the range of 0-93% by weight and the addition amount of the ethylene oxide-propylene oxide condensation-added alkylene diamine is within the range of 0-93% by weight. In a case of containing both of the alkylene oxide-resorcinol copolymer and the ethylene oxide-propylene oxide condensation-added alkylene diamine, the total addition amount of the alkylene oxide-resorcinol copolymer and the ethylene oxide-propylene oxide condensation-added alkylene diamine is 60-93% by weight.

In a case of containing either the alkylene oxide-resorcinol copolymer or the ethylene oxide-propylene oxide condensation-added alkylene diamine, the addition amount of the alkylene oxide-resorcinol copolymer or the ethylene oxide-propylene oxide condensation-added alkylene diamine is 60-93% by weight.

Moreover, one or both of the organic acid and the halogen composition are contained wherein the addition amount of the organic acid is within the range of 0-18% by weight and the addition amount of the halogen composition is within the range of 0-4% by weight. The addition amount of the rosin is 0-15% by weight and the addition amount of the thixotropic agent is 5-30% by weight as needed basis. The cleaning solder paste of this example is formed by mixing, in proportion, 80-91% by weight of solder alloy powder having the solder alloy composition of Sn-3Ag-0.5Cu (each number shows % by weight) and 9-20% by weight of the cleaning flux. The present invention is not limited only to this solder alloy.

The solder joint of the embodiment is formed by soldering by a use of the aforementioned cleaning flux and the solder alloy having a desired composition or a use of the aforementioned cleaning solder paste.

EXECUTED EXAMPLES

The flux of each of the executed examples and the comparison examples having compositions shown in the following Table 1 was prepared. The volatilization and soldering property of the flux were verified by using the flux of each of the executed examples and the comparison examples. It is to be noted that each composition ratio in Table 1 is represented by "% by weight" in the flux composition.

In the volatilization verification, model TGD9600 of Ulvac Riko, Inc. was used for a thermogravimetric measurement (TGA measurement) to measure the volatilization volume of the flux (% by weight).

Condition of Measurement:
  Preheat: 130-170° C. for 120 seconds
  Peak temperature: 245° C.
  Holding time in 220° C. or more: 46 seconds
  Atmosphere: $N_2$ In this example, if the volatilization volume is equal to or less than 20%, it is assumed to meet a desired low volatilization. Although the simple flux was used for the volatilization verification, the verification may be accomplished by using the solder paste. However, in the case of using the solder paste, since the amount of the flux is about 10% of the whole amount and the volatilization volume is insignificant amount, the measurement accuracy is limited.

The verification of the soldering property for the flux of the executed examples and the comparison examples was based on the JIS Z 3197 Solder Spreading Method. In these examples, if the spreading diameter is 80% and more, it is determined to meet the desired solder spreading property.

INDUSTRIAL APPLICABILITY

The present invention is applied to the soldering operation using the reflow furnace. The non-volatilization property thereof is preferable to be used in a vacuum reflow furnace.

TABLE 1

|  | EXECUTED EXAMPLE(EE) | | | | | | | | COMPARISON EXAMPLE (CM) | |
| --- | --- | --- | --- | --- | --- | --- | --- | --- | --- | --- |
|  | EE1 | EE2 | EE3 | EE4 | EE5 | EE6 | EE7 | EE8 | CM1 | CM2 |
| alkylene oxide-resorcinol copolymer | 30 | 65 | 20 | 54 | 23 | 87 | — | 20 | — | — |
| ethylene oxide-propylene oxide condensation-added alkylene diamine | 68 | 20 | 65 | 15 | 58 | — | 87 | 55 | 8 | 20 |
| organic acid | 2 | 15 | 5 | 5 | — | 3 | 3 | 4 | 2 | 5 |
| thixotropic agent | — | — | 10 | 25 | 15 | 10 | 10 | 5 | 30 | 15 |
| halogen compound | — | — | — | 1 | 4 | — | — | 1 | — | — |
| rosin | — | — | — | — | — | — | — | 15 | — | — |
| diethylene glycol monohexyl ether | — | — | — | — | — | — | — | — | 35 | 35 |
| ethylene diamine tetrapolyoxyethylene polyoxypropylene | — | — | — | — | — | — | — | — | 25 | 25 |
| total | 100 | 100 | 100 | 100 | 100 | 100 | 100 | 100 | 100 | 100 |
| volatilization volume | 1.8% | 14.3% | 4.8% | 5.6% | 4.5% | 2.5% | 2.8% | 4.1% | 35.7% | 38.2% |
| soldering property | ○ | ○ | ○ | ○ | ○ | ○ | ○ | ○ | ○ | ○ |

As shown in Table 1, all of the executed example 1 (EE1) and the executed example 2 (EE2), which contained the alkylene oxide-resorcinol copolymer, the ethylene oxide-propylene oxide condensation-added alkylene diamine and the activator. The executed examples 3-8 (EE3-8), which further contained the thixotropic agent, found the volatilization rate of 20% or less, so that it has been found that they meet the desired low volatilization. Moreover, it was found that the spreading diameter thereof was 80% or more and they met the desired soldering property.

On the other hand, in each comparison example to which a conventional volatile solvent component such as diethylene glycol monohexyl ether or the like was added, it has been found that they meet the soldering property but the volatilization volume thereof is larger than 30% and they do not meet the desired low volatilization.

From the executed examples 3-5, it has been found that one or both of the organic acid and the halogen agent may be used. From the executed examples 6 and 7, it has been found that only one of the alkylene oxide-resorcinol copolymer and the ethylene oxide-propylene oxide condensation-added alkylene diamine may be used.

From the executed example 8, it has been found that the rosin may be used. However, if the rosin is added to the flux, the viscosity shows a tendency to increase. Therefore, it is preferable that the addition amount of the rosin is equal to or less than 15% by weight.

From the above verification result, it has been found that the flux volatilization based on the heating during the soldering can be suppressed by adding one or both of the alkylene oxide-resorcinol copolymer and the ethylene oxide-propylene oxide condensation-added alkylene diamine instead of the conventional solvent component. Moreover, it has been found that the soldering property does not reduce and the soldering property substantial same as the conventional one can be obtained by adding one or both of the alkylene oxide-resorcinol copolymer and the ethylene oxide-propylene oxide condensation-added alkylene diamine.

The invention claimed is:

1. A flux comprising a solvent having a polarity of dissolving a flux component and a boiling point of 330° C. or higher wherein a volatilization volume occurred at a reflow soldering process is equal to or less than 20% of the whole flux volume, and
    wherein the solvent comprises:
        23-65% by weight of an alkylene oxide-resorcinol copolymer, based on the total weight of the flux;
        15-68% by weight of an ethylene oxide-propylene oxide condensation-added alkylene diamine, based on the total weight of the flux; and
        one or both of an organic acid and a halogen compound, wherein an addition amount of the organic acid is 2-18% by weight based on the total weight of the flux and an addition amount of the halogen compound is 1-4% by weight based on the total weight of the flux,
    wherein the total amount of the alkylene oxide-resorcinol copolymer and the ethylene oxide-propylene oxide condensation-added alkylene diamine is 68-98% by weight, based on the total weight of the flux.

2. The flux according to claim 1, further comprising 0-30% by weight of a thixotropic agent, based on the total weight of the flux and 0-15% by weight of rosin, based on the total weight of the flux.

3. A solder paste comprising a mixture comprising the flux of claim 1 and solder alloy powder.

4. The solder paste according to claim 3, further comprising 5-30% by weight of a thixotropic agent, based on the total weight of the flux and 0-15% by weight of rosin, based on the total weight of the flux.

5. A flux comprising a solvent having a polarity of dissolving a flux component and a boiling point of 330° C. or higher wherein a volatilization volume occurred at a reflow soldering process is equal to or less than 20% of the whole flux volume, and
    wherein the solvent comprises:
        68-98% by weight of an ethylene oxide-propylene oxide condensation-added alkylene diamine, based on the total weight of the flux; and one or both of an organic acid and a halogen compound, wherein an addition amount of the organic acid is 2-18% by weight based on the total weight of the flux and an addition amount of the halogen compound is 1-4% by weight based on the total weight of the flux.

6. The flux according to claim 5, further comprising 0-30% by weight of a thixotropic agent, based on the total weight of the flux and 0-15% by weight of rosin, based on the total weight of the flux.

* * * * *